(12) United States Patent
Horie et al.

(10) Patent No.: US 12,015,359 B2
(45) Date of Patent: Jun. 18, 2024

(54) MOTOR CONTROL DEVICE

(71) Applicant: ADVICS CO., LTD., Kariya (JP)

(72) Inventors: Yuya Horie, Kariya (JP); Tomoya Takahashi, Kariya (JP)

(73) Assignee: ADVICS CO., LTD., Kariya (JP)

( * ) Notice: Subject to any disclaimer, the term of this patent is extended or adjusted under 35 U.S.C. 154(b) by 121 days.

(21) Appl. No.: 17/802,167

(22) PCT Filed: Mar. 8, 2021

(86) PCT No.: PCT/JP2021/008952
§ 371 (c)(1),
(2) Date: Aug. 25, 2022

(87) PCT Pub. No.: WO2021/182382
PCT Pub. Date: Sep. 16, 2021

(65) Prior Publication Data
US 2023/0361703 A1    Nov. 9, 2023

(30) Foreign Application Priority Data

Mar. 10, 2020 (JP) ................. 2020-041161

(51) Int. Cl.
| | |
|---|---|
| *H03K 5/00* | (2006.01) |
| *H02P 21/18* | (2016.01) |
| *H02P 21/22* | (2016.01) |
| *H02P 27/06* | (2006.01) |

(52) U.S. Cl.
CPC ............. *H02P 21/22* (2016.02); *H02P 21/18* (2016.02); *H02P 27/06* (2013.01)

(58) Field of Classification Search
CPC ........... H02P 21/22; H02P 21/18; H02P 27/06

USPC ....................................... 318/400.2
See application file for complete search history.

(56) References Cited

U.S. PATENT DOCUMENTS

| | | | |
|---|---|---|---|
| 8,324,856 B2* | 12/2012 | Yamakawa | B60K 6/445 |
| | | | 318/82 |
| 11,267,346 B2* | 3/2022 | Joseph | B60L 50/60 |
| 2009/0160381 A1 | 6/2009 | Imura et al. | |
| 2017/0327262 A1* | 11/2017 | Eggleton | B65D 85/68 |

FOREIGN PATENT DOCUMENTS

JP         2009171825 A      7/2009

* cited by examiner

*Primary Examiner* — Erick D Glass
(74) *Attorney, Agent, or Firm* — BUCHANAN INGERSOLL & ROONEY PC (57) ABSTRACT

A current command value deriving unit of a motor control device derives a d-axis current command value and a q-axis current command value based on a torque current map and a torque command value. A voltage command value deriving unit executes a first process of deriving a d-axis voltage command value based on the d-axis current command value and deriving a q-axis voltage command value based on q-axis current command value, and a second process of deriving the d-axis voltage command value based on the q-axis current command value and deriving the q-axis voltage command value based on a limit voltage and the d-axis voltage command value. When a motor is driven by field-weakening control, the voltage command value deriving unit switches from the second process to the first process when it is determined that the voltage command value satisfying the torque command value is derivable by the first process.

8 Claims, 5 Drawing Sheets

MOTOR CONTROL DEVICE

TECHNICAL FIELD

The present disclosure relates to a motor control device that controls a synchronous motor.

BACKGROUND ART

PTL 1 discloses an example of a motor control device that performs vector control when a motor serving as a synchronous motor is rotated at a low speed, and performs field-weakening control when the motor is rotated at a high speed.

In the vector control, a d-axis current command value serving as a command value of a current of a component in a d-axis in a vector control rotation coordinate, and a q-axis current command value serving as a command value of a current of a component in a q-axis in the rotation coordinate are derived on the basis of a torque command value serving as a command value of a motor torque. The d-axis and the q-axis are orthogonal to each other in the rotation coordinate. Then, on the basis of the d-axis current command value and the q-axis current command value, a d-axis voltage command value serving as a command value of a voltage of the component in the d-axis and a q-axis voltage command value serving as a command value of a voltage of the component in the q-axis are derived. Then, the motor is driven by controlling an inverter on the basis of these voltage command values.

In the field-weakening control, the d-axis current command value is derived on the basis of a deviation between the torque command value and an actual torque of the motor, and the d-axis voltage command value is derived on the basis of the d-axis current command value. The q-axis voltage command value is derived on the basis of a limit voltage and the d-axis voltage command value. Then, the motor is driven by controlling the inverter on the basis of these voltage command values.

In the motor control described above, when a predetermined switching condition is satisfied while the field-weakening control is performed, drive control over the motor is switched from the field-weakening control to the vector control. That is, the d-axis voltage command value and the q-axis voltage command value for implementing the torque command value by vector control are derived. In a case in which a voltage vector represented by the d-axis voltage command value and the q-axis voltage command value derived in this way is set as a "determination voltage vector", when a length of the determination voltage vector falls below the limit voltage, it is determined that the predetermined switching condition is satisfied, and the drive control over the motor is switched from the field-weakening control to the vector control.

CITATION LIST

Patent Literature

PTL 1: JP-A-2009-171825

SUMMARY

Technical Problem

The determination voltage vector indicates a point on an equal torque line of the torque command value in the rotation coordinate. Depending on a method of deriving the current command value in the vector control, even when the torque command value changes, the determination voltage vector may continue to indicate an intersection point between the equal torque line of the torque command value and a voltage limit circle. In this case, since a state in which the length of the determination voltage vector is equal to the limit voltage is maintained, the length of the determination voltage vector does not fall below the limit voltage, and the drive control over the motor cannot be switched to the vector control. When the field-weakening control is continued without being switched to the vector control as described above, an efficiency may be reduced as compared to a case in which the field-weakening control is switched to the vector control.

Solution to Problem

A motor control device for solving the above technical problem is a device configured to derive a first voltage command value serving as a command value of a voltage of a component in a first axis and a second voltage command value serving as a command value of a voltage of a component in a second axis orthogonal to the first axis in a vector control rotation coordinate, and drive a motor serving as a synchronous motor on the basis of the first voltage command value and the second voltage command value. The motor control device includes: a current command value deriving unit configured to derive, as a first current command value, a current of the component in the first axis corresponding to a torque command value serving as a command value of a torque of the motor, and derive, as a second current command value, a current of the component in the second axis corresponding to the torque command value on the basis of a torque current map indicating a relationship between the torque of the motor and the current of the component in the first axis and the current of the component in the second axis; and a voltage command value deriving unit configured to perform a first process of deriving the first voltage command value on the basis of the first current command value and deriving the second voltage command value on the basis of the second current command value, and a second process of deriving the first voltage command value on the basis of the second current command value and deriving the second voltage command value on the basis of a limit voltage of the motor control device and the first voltage command value. The voltage command value deriving unit switches a process of deriving the voltage command value from the second process to the first process when it is determined that the voltage command value satisfying the torque command value is derivable by the first process in a case in which the motor is driven on the basis of the voltage command value derived by the second process.

Driving the motor on the basis of the voltage command value derived by the first process is referred to as vector control. Driving the motor on the basis of the voltage command value derived by the second process is referred to as field-weakening control.

According to the above configuration, when the motor is driven by the field-weakening control, it is determined whether the voltage command value satisfying the torque command value can be derived by the first process. Then, when it is determined that the voltage command value can be derived, the process of deriving the voltage command value is switched from the second process to the first process. In the first process, the current command value is derived by using a predetermined torque current map. Then, the motor is driven on the basis of the voltage command value derived in the first process. That is, the voltage command value derived by the first process is within a predetermined range, and the control is switched in terms of whether the torque command value can be derived within this range. Accordingly, the drive control over the motor can be switched from the field-weakening control to the vector control.

Further, when a voltage vector represented by a d-axis voltage command value and a q-axis voltage command value is set as a predetermined voltage vector, the predetermined voltage vector indicates an inside of a voltage limit circle in the rotation coordinate by switching to the vector control. As a result, the motor can be driven more efficiently than in a case in which the predetermined voltage vector continues to indicate an intersection point between an equal torque line and the voltage limit circle.

DESCRIPTION OF EMBODIMENTS

Hereinafter, an embodiment of a motor control device will be described with reference to FIGS. 1 to 6.

Figure 1:
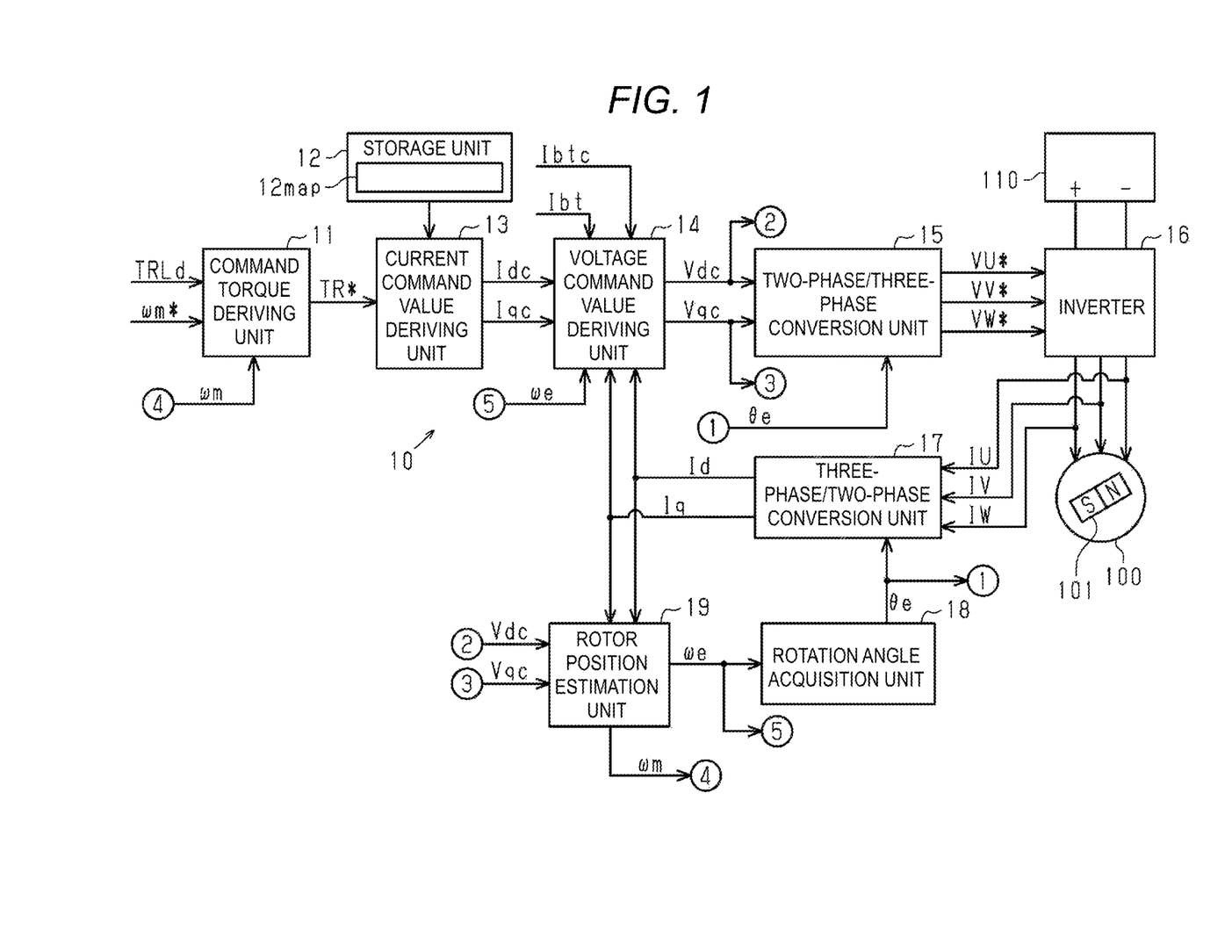
FIG. 1 is a block diagram illustrating a functional configuration of a motor control device according to an embodiment and a motor controlled by the motor control device.

FIG. 1 illustrates a motor control device 10 according to the present embodiment and a motor 100 controlled by the motor control device 10. The motor 100 includes a rotor 101 provided with a permanent magnet. The motor 100 is a magnet-embedded type synchronous motor in which the permanent magnet is embedded in the rotor 101. The motor 100 includes U-phase, V-phase, and W-phase coils as three-phase coils. The motor 100 is used as, for example, a power source of a pump for ejecting a brake fluid in an in-vehicle brake device.

The motor control device 10 drives the motor 100 by drive control for controlling a current of a component in a d-axis and a current of a component in a q-axis. The d-axis and the q-axis are control axes in a vector control rotation coordinate. The d-axis is a control axis extending in a direction of a magnetic flux axis of the permanent magnet. The q-axis is a control axis extending in a direction of a torque, and is orthogonal to the d-axis. The motor control device 10 drives the motor 100 by inputting, to the three-phase coils, signals on the basis of a command value of the current of the component in the d-axis and a command value of the current of the component in the q-axis. In the present embodiment, the d-axis corresponds to a "first axis", and the q-axis corresponds to a "second axis".

The motor control device 10 includes a command torque deriving unit 11, a storage unit 12, a current command value deriving unit 13, a voltage command value deriving unit 14, a two-phase/three-phase conversion unit 15, an inverter 16, a three-phase/two-phase conversion unit 17, a rotation angle acquisition unit 18, and a rotor position estimation unit 19.

The command torque deriving unit 11 derives a torque command value TR* serving as a command value of the torque of the motor 100. That is, the command torque deriving unit 11 derives the torque command value TR* on the basis of an estimated value TRLd of a load torque of the motor 100, a rotation speed command value ωm* serving as a command value of a rotor rotation speed of the motor 100, and an estimated rotation speed ωm serving as an estimated value of the rotor rotation speed.

The storage unit 12 stores a preset torque current map 12map. A current flowing from a motor power supply 110 toward the motor control device 10 is referred to as a power supply current Ibt, and a preset upper limit value of the power supply current is referred to as a power supply current upper limit value Ibtc. The torque current map 12map indicates a relationship between a torque TR of the motor 100 and the current of the component in the d-axis and the current of the component in the q-axis when a current larger than the power supply current upper limit value Ibtc is allowed to flow from the motor power supply 110 to the motor control device 10. For example, the current of the component in the d-axis and the current of the component in the q-axis corresponding to a first torque are a current of the component in the d-axis and a current of the component in the q-axis for setting the torque of the motor 100 as the first torque. More specifically, a current vector represented by the current of the component in the d-axis and the current of the component in the q-axis derived using the torque current map 12map indicates a point on a maximum torque curve LTRmax in the rotation coordinate.

The maximum torque curve LTRmax is a line obtained by storing a maximum torque that can be output from the motor 100 for each constant current circle having a different current value and connecting the stored points in the rotation coordinate.

The current command value deriving unit 13 derives, on the basis of the torque command value TR*, a d-axis current command value Idc serving as the command value of the current of the component in the d-axis, and a q-axis current command value Iqc serving as the command value of the current of the component in the q-axis. That is, the current command value deriving unit 13 acquires, on the basis of the torque current map 12map, the d-axis current command value Idc serving as the current of the component in the d-axis and the q-axis current command value Iqc serving as the current of the component in the q-axis corresponding to the torque command value TR*. In the present embodiment, the d-axis current command value Idc corresponds to a "first current command value", and the q-axis current command value Iqc corresponds to a "second current command value".

The voltage command value deriving unit 14 derives a d-axis voltage command value Vdc serving as a command value of a voltage of the component in the d-axis, and a q-axis voltage command value Vqc serving as a command value of a voltage of the component in the q-axis. That is, the voltage command value deriving unit 14 derives the d-axis voltage command value Vdc and the q-axis voltage command value Vqc on the basis of the current command values Idc and Iqc, a d-axis current Id, a q-axis current Iq, an estimated value ωe of an electrical angular speed of the motor 100, the power supply current upper limit value Ibtc, and the power supply current Ibt. In the present embodiment, the d-axis voltage command value Vdc corresponds to a "first voltage command value", and the q-axis voltage command value Vqc corresponds to a "second voltage command value". A specific process of deriving the d-axis voltage command value Vdc and the q-axis voltage command value Vqc will be described later.

The two-phase/three-phase conversion unit 15 converts the d-axis voltage command value Vdc and the q-axis voltage command value Vqc into a U-phase command voltage VU*, a V-phase command voltage VV*, and a W-phase command voltage VW* on the basis of an estimated rotor rotation angle (electrical angle) θe serving as an estimated value of a rotation angle of the rotor 101. The U-phase command voltage VU* is a command value of a voltage applied to the U-phase coil. The V-phase command voltage VV* is a command value of a voltage applied to the V-phase coil. The W-phase command voltage VW* is a command value of a voltage applied to the W-phase coil.

The inverter 16 includes a plurality of switching elements that are operated by electric power supplied from the motor power supply 110. The inverter 16 generates a U-phase signal by an on/off operation of the switching element on the basis of the U-phase command voltage VU* received from the two-phase/three-phase conversion unit 15. The inverter 16 generates a V-phase signal by an on/off operation of the switching element on the basis of the received V-phase command voltage VV*. The inverter 16 generates a W-phase signal by an on/off operation of the switching element on the basis of the received W-phase command voltage VW*. Then, the U-phase signal is input to the U-phase coil, the V-phase signal is input to the V-phase coil, and the W-phase signal is input to the W-phase coil in the motor 100. Then, when the signals generated by the inverter 16 are input to the motor 100, the motor 100 is driven. The signals generated by the inverter 16 are signals on the basis of the d-axis voltage command value Vdc and the q-axis voltage command value Vqc.

The three-phase/two-phase conversion unit 17 receives U-phase current IU serving as a current flowing through the U-phase coil of the motor 100, a V-phase current IV serving as a current flowing through the V-phase coil, and a W-phase current IW serving as a current flowing through the W-phase coil. Then, the three-phase/two-phase conversion unit 17 converts, on the basis of the estimated rotor rotation angle (electrical angle) θe, the U-phase current IU, the V-phase current IV, and the W-phase current IW into the d-axis current Id serving as the current of the component in the d-axis and the q-axis current Iq serving as the current of the component in the q-axis.

The rotor position estimation unit 19 derives an axial phase deviation Δθ between a direction of an actual d-axis and a direction of an estimated d-axis. The rotor position estimation unit 19 receives the d-axis current Id and the q-axis current Iq derived by the three-phase/two-phase conversion unit 17. Further, the rotor position estimation unit 19 receives the d-axis voltage command value Vdc and the q-axis voltage command value Vqc derived by the voltage command value deriving unit 14. The rotor position estimation unit 19 derives the axial phase deviation Δθ by, for example, an extended induced voltage method. In this case, the rotor position estimation unit 19 derives the axial phase deviation Δθ on the basis of the d-axis current Id, the q-axis current Iq, the d-axis voltage command value Vdc, and the q-axis voltage command value Vqc.

In addition, the rotor position estimation unit 19 derives the estimated value ωe of the electrical angular speed of the rotor 101. For example, the rotor position estimation unit 19 derives the estimated value ωe of the electrical angular speed by performing proportional integral control such that the axial phase deviation Δθ is a target value "0". The rotor position estimation unit 19 derives the estimated rotation speed cm serving as a mechanical angle of the rotor 101 by dividing the estimated value ωe of the electrical angular speed by the number of pole pairs Pn of the motor 100.

The rotation angle acquisition unit 18 acquires the estimated rotor rotation angle θe. The rotation angle acquisition unit 18 derives the estimated rotor rotation angle θe by, for example, integrating the estimated value ωe of the electrical angular speed derived by the rotor position estimation unit 19.

Figure 2:
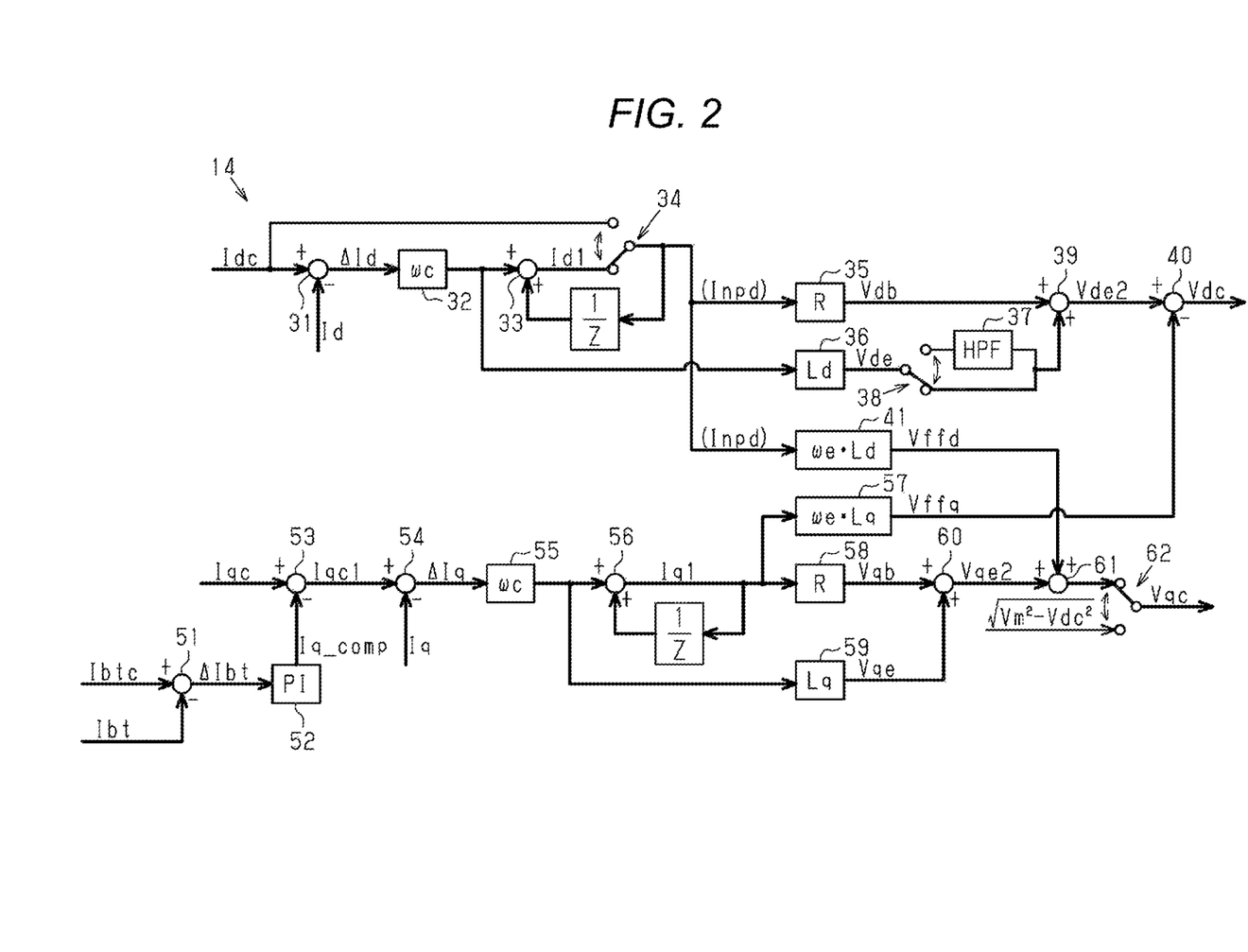
FIG. 2 is a block diagram illustrating a functional configuration of a voltage command value deriving unit of the motor control device.

Next, a circuit configuration of the voltage command value deriving unit 14 will be described in detail with reference to FIG. 2.

The voltage command value deriving unit 14 includes a first d-axis calculator 31 that derives a d-axis current deviation ΔId serving as a deviation between the d-axis current command value Idc and the d-axis current Id, and a second d-axis calculator 32 that derives a product of the d-axis current deviation ΔId and a response frequency ωc of the motor 100.

The voltage command value deriving unit 14 includes a d-axis integrator 33 that receives a derived value (=ΔId·ωc) derived by the second d-axis calculator 32. When a value selected by a first d-axis switch unit 34 to be described later is a d-axis selection value Inpd, the d-axis integrator 33 derives a sum of a previous value of the d-axis selection value Inpd and the derived value derived by the second d-axis calculator 32 as a latest value of a d-axis current integrated value Id1. The previous value of the d-axis selection value Inpd is the d-axis selection value Inpd selected by the first d-axis switch unit 34 in a previous control cycle.

The voltage command value deriving unit 14 includes the first d-axis switch unit 34 that selects one of the d-axis current command value Idc and the latest value of the d-axis current integrated value Id1 and outputs the selected value as the d-axis selection value Inpd, and a resistance value integrator 35 that derives a product of the d-axis selection value Inpd and a resistance value R of the motor 100 as a d-axis reference voltage Vdb. The voltage command value deriving unit 14 includes a d-axis inductance integrator 36 that derives a product of the derived value derived by the second d-axis calculator 32 and a d-axis inductance Ld of the motor 100 as a calculated value Vde. The voltage command value deriving unit 14 includes a high-pass filter 37 that extracts a high-frequency component of the calculated value Vde and outputs the high-frequency component to a third d-axis calculator 39. The voltage command value deriving unit 14 includes a second d-axis switch unit 38 that selects one value of the high-frequency component extracted by the high-pass filter 37 and the calculated value Vde and outputs the selected value to the third d-axis calculator 39. Then, the third d-axis calculator 39 derives a sum of the value selected by the second d-axis switch unit 38 and the d-axis reference voltage Vdb as a calculated value Vde2.

The voltage command value deriving unit 14 includes a fourth d-axis calculator 40 that derives a sum of a q-axis F/F value Vffq derived by a q-axis side non-interference F/F unit 57 to be described later and the calculated value Vde2 as the d-axis voltage command value Vdc.

The voltage command value deriving unit 14 further includes a d-axis side non-interference F/F unit 41 that receives the d-axis selection value Inpd selected by the first d-axis switch unit 34. The d-axis side non-interference F/F unit 41 derives a product of the d-axis selection value Inpd, the estimated value ωe of the electrical angular speed of the motor 100, and the d-axis inductance Ld of the motor 100 as a d-axis F/F value Vffd. The d-axis F/F value Vffd corresponds to a component in which the voltage of the component in the d-axis influences a q-axis side. Therefore, the d-axis F/F value Vffd is input to a fifth q-axis calculator 61 to be described later.

The voltage command value deriving unit 14 includes a power supply current calculator 51 that derives a power supply current deviation ΔIbt serving as a deviation between the power supply current upper limit value Ibtc and the power supply current Ibt, and an F/B unit 52 that derives a calculated value Iq_comp by performing feedback control using the power supply current deviation ΔIbt as an input. The voltage command value deriving unit 14 includes a first q-axis calculator 53 that derives, as a corrected q-axis current command value Iqc1, a value obtained by subtracting the calculated value Iq_comp from the q-axis current command value Iqc, and a second q-axis calculator 54 that derives a q-axis current deviation ΔIq serving as a deviation between the corrected q-axis current command value Iqc1 and the q-axis current Iq.

The voltage command value deriving unit 14 includes a third q-axis calculator 55 that derives a product of the q-axis current deviation ΔIq and the response frequency ωc. The voltage command value deriving unit 14 includes a q-axis integrator 56 that derives a value obtained by integrating a derived value (=ΔIq·ωc) derived by the third q-axis calculator 55 as a q-axis current integrated value Iq1. When the q-axis current integrated value Iq1 derived in the previous control cycle by the q-axis integrator 56 is set as a previous value of the q-axis current integrated value Iq1, the q-axis integrator 56 derives a sum of the previous value of the q-axis current integrated value Iq1 and the derived value derived by the third q-axis calculator 55 as a latest value of the q-axis current integrated value Iq1.

The voltage command value deriving unit 14 includes the q-axis side non-interference F/F unit 57 that receives the latest value of the q-axis current integrated value Iq1. The q-axis side non-interference F/F unit 57 derives a product of the q-axis current integrated value Iq1, the estimated value ωe of the electrical angular speed, and a q-axis inductance Lq of the motor 100 as the q-axis F/F value Vffq. The q-axis F/F value Vffq corresponds to a component in which the voltage of the component in the q-axis influences a d-axis side. Therefore, the q-axis F/F value Vffq is input to the fourth d-axis calculator 40.

The voltage command value deriving unit 14 includes a resistance value integrator 58 that derives a product of the latest value of the q-axis current integrated value Iq1 and the resistance value R as a q-axis reference voltage Vqb, and a q-axis inductance integrator 59 that derives a product of the derived value derived by the third q-axis calculator 55 and the q-axis inductance Lq as a calculated value Vqe. The voltage command value deriving unit 14 includes a fourth q-axis calculator 60 that derives a sum of the q-axis reference voltage Vqb and the calculated value Vqe as a calculated value Vqe2, and the fifth q-axis calculator 61 that derives a sum of the d-axis F/F value Vffd derived by the d-axis side non-interference F/F unit 41 and the calculated value Vqe2.

The voltage command value deriving unit 14 includes a q-axis switch unit 62 that selects one value of the value derived by the fifth q-axis calculator 61 and a square root of a difference between a value obtained by squaring a limit voltage Vm of the motor control device 10 and a value obtained by squaring the d-axis voltage command value Vdc. The value selected by the q-axis switch unit 62 is output as the q-axis voltage command value Vqc. The limit voltage Vm is a value on the basis of a voltage of the motor power supply 110, and is a voltage that can be output from the inverter 16. Therefore, the motor 100 cannot output a voltage exceeding the limit voltage Vm.

In the present embodiment, for the drive control over the motor 100, the vector control and the field-weakening control is selectively used. The vector control is drive control for low-speed rotation, and the field-weakening control is drive control for high-speed rotation.

Next, the vector control will be described with reference to FIG. 2.

When the motor 100 is driven by the vector control, the first d-axis switch unit 34 selects the d-axis current integrated value Id1. That is, when the motor 100 is driven by the vector control, a value obtained by integrating the derived value derived by the second d-axis calculator 32 is used to derive each of the voltage command values Vdc and Vqc. The second d-axis switch unit 38 selects to input the calculated value Vde to the third d-axis calculator 39. The q-axis switch unit 62 selects the value derived by the fifth q-axis calculator 61 as the q-axis voltage command value Vqc. A process of deriving the d-axis voltage command value Vdc and the q-axis voltage command value Vqc in a state in which the switch units 34, 38, and 62 are operated as illustrated in FIG. 2 is also referred to as a "first process". That is, in the first process, the d-axis voltage command value Vdc is derived on the basis of the d-axis current command value Idc, and the q-axis voltage command value Vqc is derived on the basis of the q-axis current command value Iqc.

Next, the field-weakening control will be described with reference to FIG. 3.

When the motor 100 is driven by the field-weakening control, the first d-axis switch unit 34 selects the d-axis current command value Idc. The second d-axis switch unit 38 selects to input the high-frequency fluctuation component extracted by the high-pass filter 37 from the calculated value Vde to the third d-axis calculator 39. That is, when the motor 100 is driven by the field weakening control, the high-frequency fluctuation component of the calculated value Vde is used to derive each of the voltage command values Vdc and Vqc. The high-frequency fluctuation component extracted by the high-pass filter 37 can also be said to be a high-frequency fluctuation component of the d-axis current Id. The q-axis switch unit 62 selects the square root of the difference between the value obtained by squaring the limit voltage Vm and the value obtained by squaring the d-axis voltage command value Vdc. A process of deriving the d-axis voltage command value Vdc and the q-axis voltage command value Vqc in a state in which the switch units 34, 38, and 62 are operated as illustrated in FIG. 3 is also referred to as a "second process". That is, in the second process, the d-axis voltage command value Vdc is derived on the basis of the d-axis current command value Idc and the q-axis current command value Iqc, and the q-axis voltage command value Vqc is derived on the basis of the limit voltage Vm and the d-axis voltage command value Vdc. More specifically, in the second process, the d-axis voltage command value Vdc is derived on the basis of the high-frequency fluctuation component of the d-axis current Id and the q-axis current command value Iqc.

Even when the second process is executed, that is, even when the motor 100 is driven by the field-weakening control, the sum of the d-axis F/F value Vffd derived by the d-axis side non-interference F/F unit 41 and the calculated value Vqe2 is derived by the fifth q-axis calculator 61. When the sum is referred to as a "switching voltage value Vqc'", the switching voltage value Vqc' is derived on the basis of the d-axis current command value Idc and the q-axis current deviation ΔIq. As will be described in detail later, the switching voltage value Vqc' is used as a determination criterion for switching from the field-weakening control to the vector control.

Figure 4:
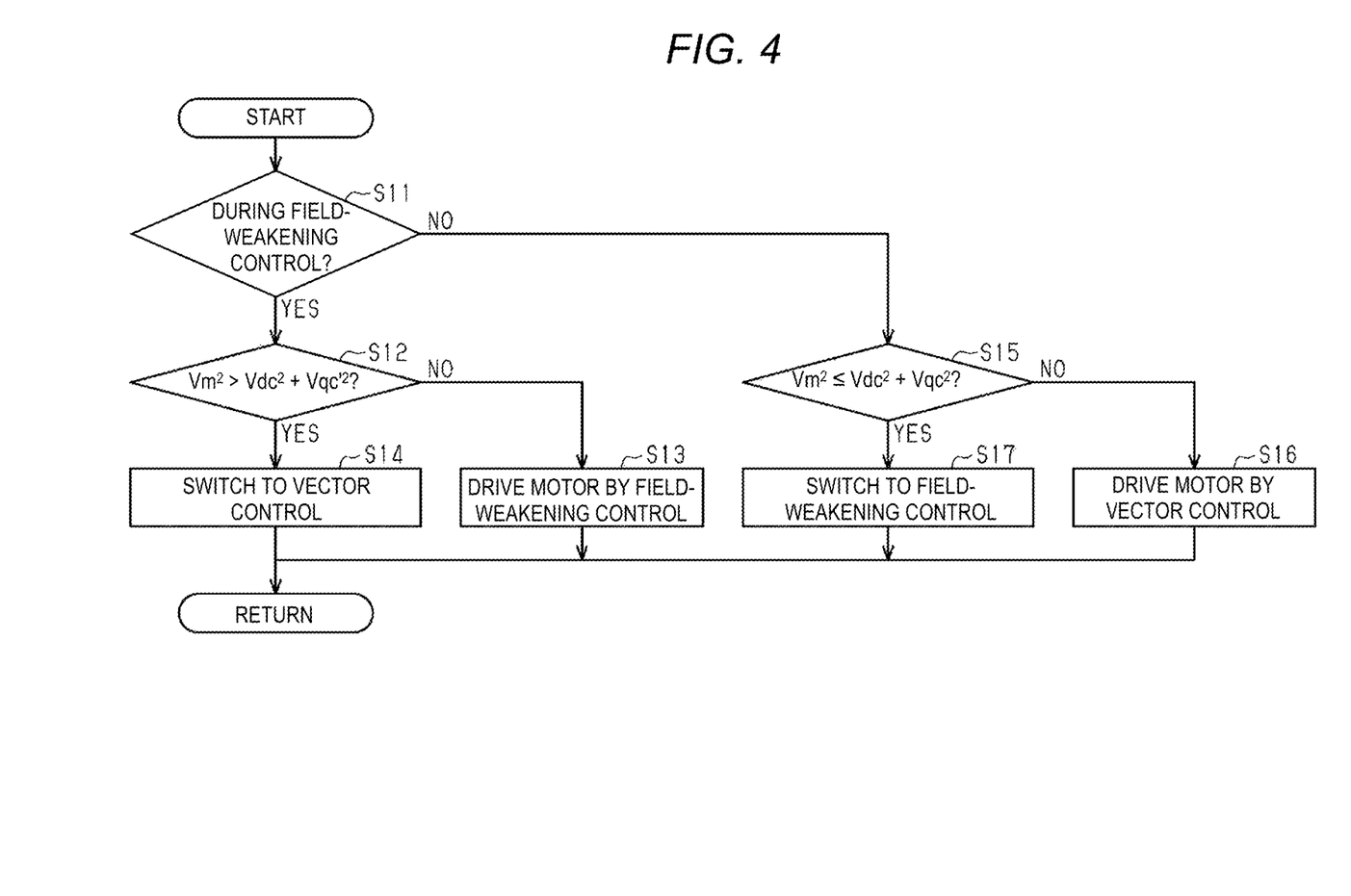
FIG. 4 is a flowchart illustrating a process routine executed by the voltage command value deriving unit.

Next, a process routine executed by the motor control device 10 will be described with reference to FIG. 4. The process routine is repeatedly executed at every predetermined control cycle.

In the present process routine, in step S11, it is determined whether the motor 100 is being driven by the field-weakening control. When it is determined that the motor 100 is driven by the field-weakening control (YES in S11), the process proceeds to a next step S12. In step S12, it is determined whether a first switching condition is satisfied. In the present embodiment, when the following conditional expression (Formula 1) is satisfied, it is determined that the first switching condition is satisfied. On the other hand, when the conditional expression (Formula 1) is not satisfied, it is determined that the first switching condition is not satisfied.

[Math. 1]

$$Vm^2 > Vdc^2 + Vqc'^2 \quad \text{(Formula 1)}$$

Figure 3:
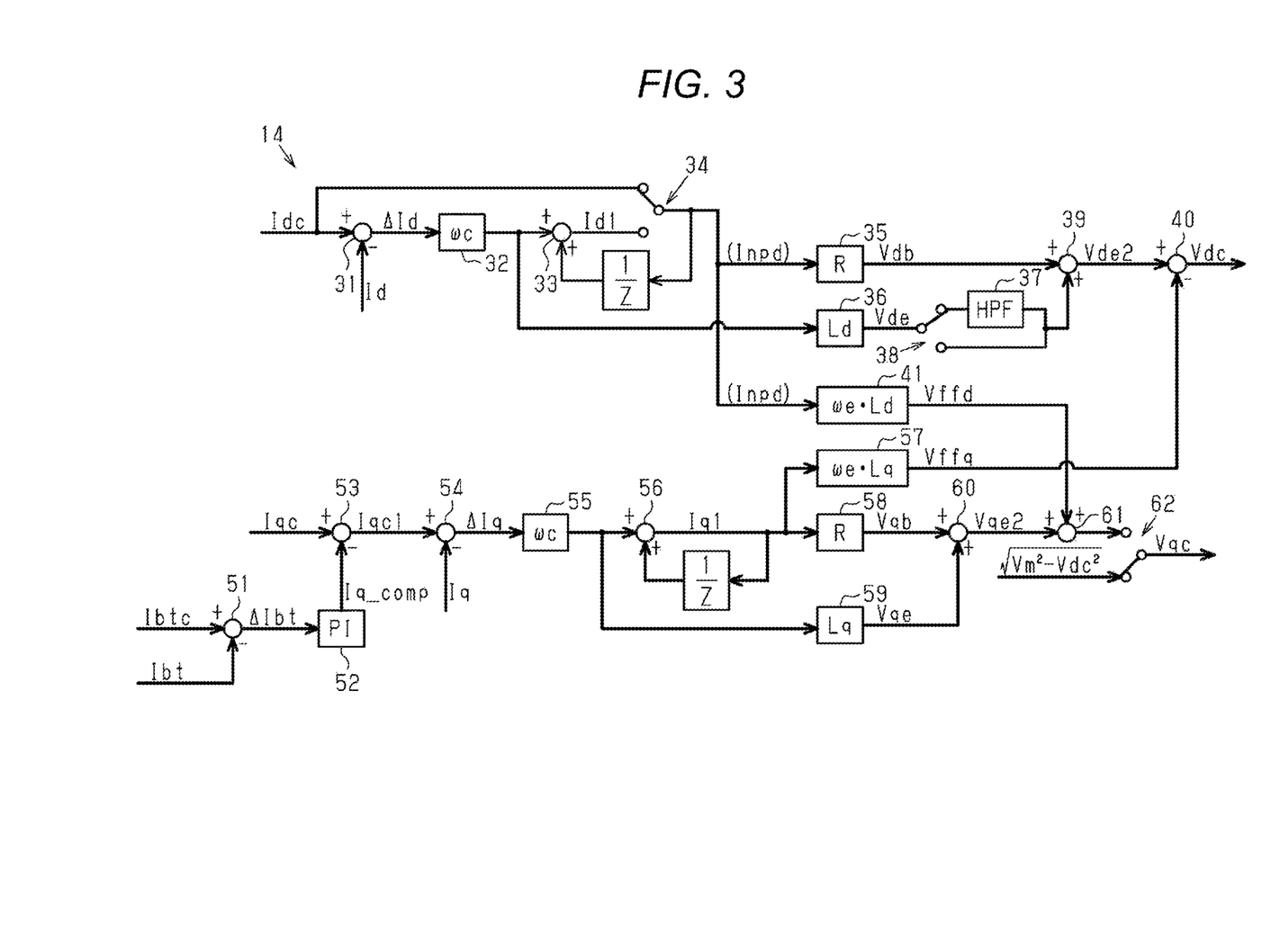
FIG. 3 is a block diagram illustrating a functional configuration of the voltage command value deriving unit.

As illustrated in FIG. 3, the switching voltage value Vqc' can be said to be a q-axis voltage command value derived to implement the torque command value TR* by the vector control. Therefore, in a case in which a voltage vector in which the voltage of the component in the d-axis is the d-axis voltage command value Vdc and the voltage of the component in the q-axis is the switching voltage value Vqc' is a determination voltage vector, when the determination voltage vector indicates a point in a voltage limit circle C1 in the rotation coordinate, the torque command value TR* can be satisfied even when the switching from the field-weakening control to the vector control is performed. That is, it can be determined that the voltage command values Vdc and Vqc each satisfying the torque command value TR* can be derived by the first process. On the other hand, when the determination voltage vector indicates a point outside the voltage limit circle C1 in the rotation coordinate, the torque command value TR* cannot be satisfied when the switching from the field-weakening control to the vector control is performed. The point indicating the determination voltage vector in the rotation coordinate, that is, a direction and a length of the determination voltage vector change when the torque command value TR* changes. The voltage limit circle is a circle determined in the rotation coordinate and changes depending on characteristics of the motor 100. The motor 100 cannot output the d-axis current Id and the q-axis current Iq outside the voltage limit circle. The larger the limit voltage Vm is, the larger the voltage limit circle becomes, and the larger the rotor rotation speed of the motor 100 is, the larger a counter electromotive force of the motor 100 becomes, and thus the voltage limit circle becomes smaller. Theoretically, the voltage command values Vdc and Vqc each satisfying the torque command value TR* are a d-axis voltage and a q-axis voltage that allow the torque of the motor 100 to be the torque command value TR*.

In step S12, when the difference between the value obtained by squaring the limit voltage Vm and the value obtained by squaring the d-axis voltage command value Vdc is equal to or smaller than a value obtained by squaring the switching voltage value Vqc' (NO in S12), it is determined that the voltage command values Vdc and Vqc each satisfying the torque command value TR* cannot be derived by the first process, and therefore it is determined that the first switching condition is not satisfied, and the process proceeds to a next step S13. In step S13, a state in which the motor 100 is driven by the field-weakening control is continued. Then, the present process routine is temporarily ended.

On the other hand, in step S12, when the difference between the value obtained by squaring the limit voltage Vm and the value obtained by squaring the d-axis voltage command value Vdc is larger than the value obtained by squaring the switching voltage value Vqc' (YES), it can be determined that the voltage command values Vdc and Vqc each satisfying the torque command value TR* can be derived by the first process, and thus it is determined that the first switching condition is satisfied, and the process proceeds to a next step S14. In step S14, the drive control over the motor 100 is switched from the field-weakening control to the vector control. That is, the process of deriving the voltage command values Vdc and Vqc is switched from the second process to the first process. Then, the present process routine is temporarily ended.

When the process of deriving the voltage command values Vdc and Vqc is switched from the second process to the first process, the first d-axis switch unit 34 selects the d-axis current integrated value Id1. Immediately after the first d-axis switch unit 34 switches from a state of selecting the d-axis current command value Idc to a state of selecting the d-axis current integrated value Id1, a previous value of the d-axis current integrated value Id1 is the d-axis current command value Idc. That is, the d-axis current integrated value Id1 immediately after the switching is a sum of a previous value of the d-axis current command value Idc and the derived value derived by the second d-axis calculator 32. Further, since the d-axis current deviation ΔId is small immediately after the switching, the derived value derived by the second d-axis calculator 32 immediately after the switching is small. That is, the d-axis current integrated value Id1 immediately after the switching is substantially equal to the previous value of the d-axis current command value Idc. Therefore, it can be said that when the switching from the second process to the first process is performed and initial derivation of the voltage command values Vdc and Vqc in the first process is performed, the voltage command values Vdc and Vqc are derived according to the previous value of the d-axis current command value Idc.

On the other hand, when it is determined in step S11 that the motor 100 is not driven by the field-weakening control (NO), the motor 100 is driven by the vector control, and thus the process proceeds to a next step S15. In step S15, it is determined whether a second switching condition is satisfied. In the present embodiment, when the following conditional expression (Formula 2) is satisfied, it is determined that the second switching condition is satisfied. On the other hand, when the conditional expression (Formula 2) is not satisfied, it is determined that the second switching condition is not satisfied.

[Math. 2]

$$Vm^2 \le Vdc^2 + Vqc^2 \quad \text{(Formula 2)}$$

That is, when the difference between the value obtained by squaring the limit voltage Vm and the value obtained by squaring the d-axis voltage command value Vdc is larger than a value obtained by squaring the q-axis voltage command value Vqc (NO in S15), it is determined that the second switching condition is not satisfied, and thus the process proceeds to a next step S16. In step S16, the drive control over the motor 100 by the vector control is performed. Then, the present process routine is temporarily ended.

On the other hand, in step S15, when the difference between the value obtained by squaring the limit voltage Vm and the value obtained by squaring the d-axis voltage command value Vdc is equal to or smaller than the value obtained by squaring the q-axis voltage command value Vqc (YES), it is determined that the second switching condition is satisfied, and thus the process proceeds to a next step S17. In step S17, the drive control over the motor 100 is switched from the vector control to the field-weakening control. Then, the present process routine is temporarily ended.

Next, operations and effects of the present embodiment will be described with reference to FIGS. 5 and 6.

When the motor 100 is driven by the field-weakening control, the d-axis voltage command value Vdc and the q-axis voltage command value Vqc are derived by the second process. In the second process, the d-axis voltage command value Vdc is derived on the basis of the d-axis current command value Idc and the q-axis current command value Iqc. The square root of the difference between the value obtained by squaring the limit voltage Vm and the value obtained by squaring the d-axis voltage command value Vdc is derived as the q-axis voltage command value Vqc. Then, the inverter 16 is operated on the basis of the voltage command values Vdc and Vqc derived in this way, thereby driving the motor 100. When the motor 100 is driven by the field-weakening control, the switching voltage value Vqc' is derived.

Figure 5:
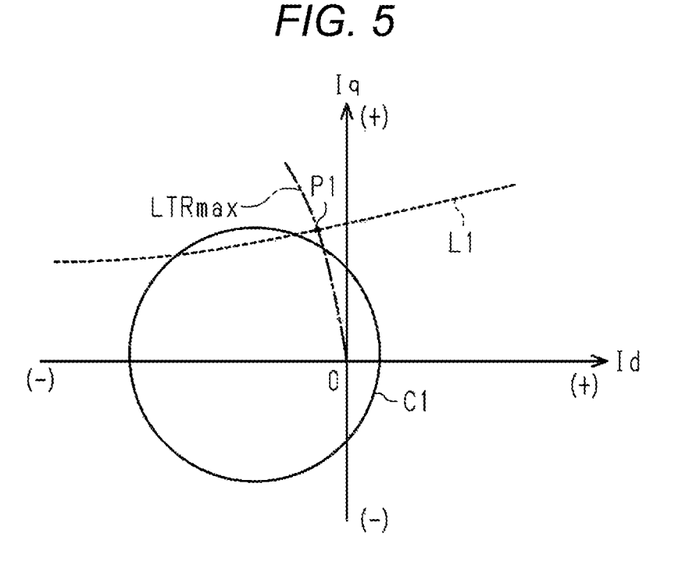
FIG. 5 is a diagram illustrating a relationship among a voltage limit circle, a maximum torque curve, and an equal torque curve of a torque command value in a vector control rotation coordinate.

Here, in a case in which the voltage vector when the voltage of the component in the d-axis is the d-axis voltage command value Vdc and the voltage of the component in the q-axis is the switching voltage value Vqc' is the determination voltage vector, the determination voltage vector indicates an intersection point P1 between the maximum torque curve LTRmax and an equal torque line L1 of the torque command value TR* in the rotation coordinate illustrated in FIG. 5. The d-axis current command value Idc is a value on the basis of the torque command value TR*, and the switching voltage value Vqc' is derived on the basis of the d-axis current command value Idc. That is, as the torque command value TR* decreases, the switching voltage value Vqc' also decreases. Therefore, according to the torque command value TR*, the intersection point P1, which is a point indicated by the determination voltage vector, is disposed outside the voltage limit circle C1 as illustrated in FIG. 5, or the intersection point P1 is disposed inside the voltage limit circle C1 as illustrated in FIG. 6. As illustrated in FIG. 5, when the intersection point P1 is located outside the voltage limit circle C1, the difference between the value obtained by squaring the limit voltage Vm and the value obtained by squaring the d-axis voltage command value Vdc is equal to or smaller than the value obtained by squaring the switching voltage value Vqc'. Therefore, the drive control over the motor 100 is not switched from the field-weakening control to the vector control.

Figure 6:
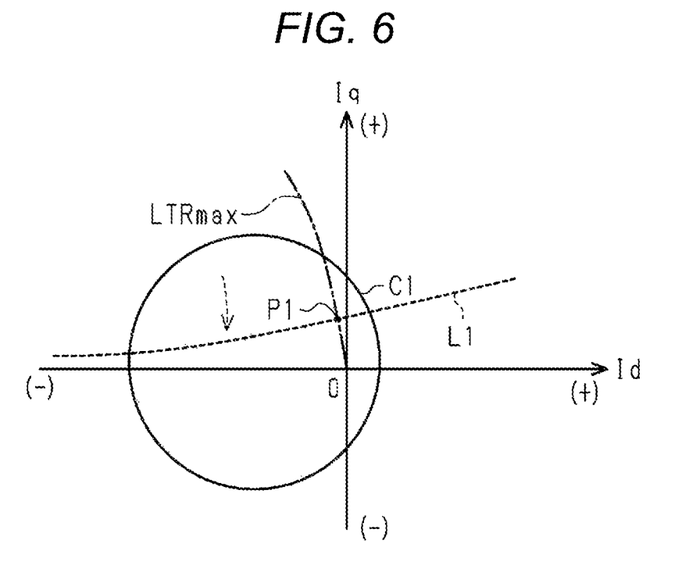
FIG. 6 is a diagram illustrating a relationship among the voltage limit circle, the maximum torque curve, and the equal torque curve of the torque command value in the rotation coordinate.

However, when the torque command value TR* becomes small, the equal torque line L1 of the torque command value TR* is displaced in the rotation coordinate as indicated by a dashed arrow in FIG. 6. Then, as illustrated in FIG. 6, when the intersection point P1 is located within the voltage limit circle C1, the difference between the value obtained by squaring the limit voltage Vm and the value obtained by squaring the d-axis voltage command value Vdc is larger than the value obtained by squaring the switching voltage value Vqc'. In this case, by driving the motor 100 on the basis of the voltage command values Vdc and Vqc derived by the first process, it is theoretically possible to set the torque of the motor 100 to the torque command value TR*. Therefore, the drive control over the motor 100 is switched from the field-weakening control to the vector control.

Here, a comparative example in which the q-axis voltage command value Vqc is used instead of the switching voltage value Vqc' in the determination of the switching from the field-weakening control to the vector control is considered. In the second process executed in the comparative example, the d-axis current integrated value Id1 is selected by the first d-axis switch unit 34. Then, the previous value of the d-axis current integrated value Id1 is larger than that in a case of the present embodiment in which the switching voltage value Vqc' is used for the switching determination. This is because the d-axis current Id is large and deviates from the d-axis current command value Idc during the field-weakening control, and therefore the d-axis current deviation ΔId becomes a large value, and the derived value derived by the second d-axis calculator 32 becomes a large value. Accordingly, the d-axis current integrated value Id1 becomes a large value, and the d-axis current integrated value Id1 is updated on the basis of the previous value thereof. Then, since the d-axis current integrated value Id1 is a large value, the d-axis F/F value Vffd increases. As a result, the q-axis voltage command value Vqc becomes a large value. Similarly, since the d-axis current integrated value Id1 is a large value, the d-axis reference voltage Vdb increases. Then, since the calculated value Vde2 increases, the d-axis voltage command value Vdc also becomes a large value. As a result, a relationship in which a sum of the square of the d-axis voltage command value Vdc and the square of the q-axis voltage command value Vqc is always larger than the square of the limit voltage Vm is established. In this case, the determination in step S12 is not "YES", and the field-weakening control is continued.

In contrast, in the second process executed in the present embodiment, the first d-axis switch unit 34 selects the d-axis current command value Idc. Accordingly, the switching voltage value Vqc' that is not influenced by the d-axis current Id can be used for the switching determination, instead of the q-axis voltage command value Vqc that is influenced by the d-axis current Id. Since the switching voltage value Vqc' is calculated based on the d-axis current command value Idc on the basis of the torque current map 12map, the switching voltage value Vqc' does not become a large value, unlike the q-axis voltage command value Vqc derived in the comparative example. Similarly, in the second process executed in the present embodiment, since the d-axis voltage command value Vdc is also calculated based on the d-axis current command value Idc, the d-axis voltage command value Vdc does not become a large value, unlike the d-axis voltage command value Vdc derived in the comparative example. Therefore, when the d-axis current command value Idc decreases, a sum of the square of the d-axis voltage command value Vdc and the square of the q-axis voltage command value Vqc becomes smaller than the square of the limit voltage Vm. Therefore, the drive control over the motor 100 can be switched from the field-weakening control to the vector control.

When the motor 100 is driven by the vector control, the d-axis voltage command value Vdc and the q-axis voltage command value Vqc are derived by the first process. In the first process, the d-axis voltage command value Vdc and the q-axis voltage command value Vqc are derived on the basis of the d-axis current deviation ΔId and the q-axis current deviation ΔIq. Then, the inverter 16 is operated on the basis of the voltage command values Vdc and Vqc derived in this way, thereby driving the motor 100.

In a case in which the motor 100 is driven by the vector control, when the torque command value TR* increases, a state in which the difference between the value obtained by squaring the limit voltage Vm and the value obtained by squaring the d-axis voltage command value Vdc is larger than the value obtained by squaring the q-axis voltage command value Vqc is shifted to a state in which the difference is equal to or smaller than the value obtained by squaring the q-axis voltage command value Vqc. When the state is shifted in this way, the drive control over the motor 100 is switched from the vector control to the field-weakening control.

In the present embodiment, the following effects can be further obtained.

(1) In a case in which the motor 100 is driven by the field-weakening control, when the rotor rotation speed of the motor 100 increases, the q-axis current Iq may resonate with respect to the corrected q-axis current command value Iqc1. Therefore, in the present embodiment, when the motor 100 is driven by the field-weakening control, the d-axis voltage command value Vdc is derived using the high-frequency component of the calculated value Vde. The high-frequency component of the calculated value Vde is a high-frequency vibration component of the d-axis current Id. By driving the motor 100 on the basis of the d-axis voltage command value Vdc and the q-axis voltage command value Vqc obtained based on the limit voltage Vm, a resonance of the q-axis current Iq with respect to the corrected q-axis current command value Iqc1 can be cancelled. As a result, it is possible to improve controllability when the motor 100 is rotated at a high speed by the field-weakening control.

(2) In a case in which the drive control over the motor 100 is switched from the field-weakening control to the vector control, when the voltage command values Vdc and Vqc greatly change, rotation of the motor 100 may fluctuate along with the switching of the drive control. In this regard, in the present embodiment, in a case in which the voltage command values Vdc and Vqc are switched from the second process to the first process, when the initial derivation of the d-axis voltage command value Vdc and the q-axis voltage command value Vqc is performed, the d-axis voltage command value Vdc and the q-axis voltage command value Vqc are derived using the previous value of the d-axis current command value Idc. Accordingly, it is possible to prevent a sudden change in the d-axis voltage command value Vdc and the q-axis voltage command value Vqc when the switching of the drive control is performed, and thus it is possible to prevent a fluctuation in a rotation speed of the motor 100 due to the switching of the drive control.

(3) As described above, the torque current map 12map is created so as to allow a current larger than the power supply current upper limit value Ibtc to flow from the motor power supply 110 to the motor control device 10. On the other hand, the voltage command values Vdc and Vqc are derived on the basis of the calculated value Iq_comp derived by the feedback control over the power supply current upper limit value Ibtc and the power supply current Ibt. Accordingly, it is possible to prevent a state in which the power supply current Ibt exceeds the power supply current upper limit value Ibtc from continuing while deriving the current command values Idc and Iqc using the map 12map as described above.

The power supply current upper limit value Ibtc is a value determined based on a design basic performance of the motor 100. However, due to manufacturing of the motor 100, it is inevitable that there is a variation in the performance of the motor 100. That is, the motor 100 having a performance different from the design basic performance may be controlled by the motor control device 10. In the present embodiment, even when such a motor 100 is controlled, it is possible to increase the actual power supply current Ibt to the power supply current upper limit value Ibtc when the motor 100 is driven. That is, even when there is a variation in the performance of the motor 100 to be controlled by the motor control device 10, the motor 100 can be driven by making maximum use of the electric power that can be supplied from the motor power supply 110.

(4) Further, the torque current map 12map is created such that the current vector represented by the current of the component in the d-axis and the current of the component in the q-axis derived using the torque current map 12map indicates the point on the maximum torque curve LTRmax in the rotation coordinate. Therefore, it is possible to drive the motor 100 while using electric energy at a maximum efficiency.

(5) In the present embodiment, in the second process, the feedback control using the power supply current deviation ΔIbt serving as the deviation between the power supply current upper limit value Ibtc and the power supply current Ibt as the input is performed. The feedback control using the power supply current deviation ΔIbt as the input can be performed even in the first process, and it is necessary to perform the feedback control not only on the q-axis current command value Iqc but also on the d-axis current command value Idc. In contrast, in the second process, the q-axis voltage command value Vqc is derived on the basis of the limit voltage Vm and the d-axis voltage command value Vdc derived on the basis of the corrected q-axis current command value Iqc1 obtained by the feedback control. Therefore, the corrected q-axis current command value Iqc1 is derived so as to satisfy the power supply current upper limit value Ibtc, and a value obtained by subtracting the q-axis current Iq from the power supply current upper limit value Ibtc flows as the d-axis current Id, and thus the d-axis current Id does not depend on the d-axis current command value Idc. Therefore, when the feedback control using the deviation between the power supply current upper limit value Ibtc and the power supply current Ibt as the input is performed in the second process, it is not necessary to perform the feedback control using the deviation between the power supply current upper limit value Ibtc and the power supply current Ibt as the input with respect to the d-axis current command value Idc, and thus a configuration can be simplified.

In the present embodiment, when a command indicates that the power supply current Ibt exceeds the power supply current upper limit value Ibtc during the first process, the determination in step S15 is "YES", and thus the process proceeds to the second process. Then, in the second process, since the feedback control using the deviation between the power supply current upper limit value Ibtc and the power supply current Ibt as the input is performed, the power supply current Ibt does not exceed the power supply current upper limit value Ibtc.

The present embodiment can be modified and implemented as follows. The present embodiment and the following modifications can be implemented in combination with each other within a range in which the embodiment and the modification do not technically contradict each other.

The torque current map 12map may indicate a relationship between the torque TR of the motor 100 and the current of the component in the d-axis and the current of the component in the q-axis when a current exceeding the power supply current upper limit value Ibtc is not allowed to flow from the motor power supply 110 to the motor control device 10. In this case, the process of correcting the q-axis current command value Iqc by the calculated value Iq_comp derived by the feedback control over the power supply current upper limit value Ibtc and the power supply current Ibt may be omitted.

The torque current map 12map may be created such that the current vector represented by the current of the component in the d-axis and the current of the component in the q-axis derived using the map 12map indicates a point on a torque curve different from the maximum torque curve LTRmax. For example, when a torque curve obtained by connecting contact points between a constant torque curve and a constant current circle indicating a value obtained by subtracting a predetermined value from the maximum torque that can be output from the motor 100 at each current is set as a predetermined torque curve in the rotation coordinate, the torque current map 12map may be created such that the current vector represented by the current of the component in the d-axis and the current of the component in the q-axis derived using the map 12map indicates a point on the predetermined torque curve.

When the d-axis voltage command value Vdc is derived using the high-frequency component of the calculated value Vde in the second process, the torque current map 12map may not be used to derive the current command values Idc and Iqc.

When the field-weakening control is switched to the vector control and the initial derivation of the voltage command values Vdc and Vqc is performed by the first process, the voltage command values Vdc and Vqc may be derived without using the previous value of the d-axis current command value Idc.

When the d-axis voltage command value Vdc is derived in the second process, the high-frequency component of the calculated value Vde may not be used. In this case, the d-axis voltage command value Vdc may be obtained by using the q-axis current command value Iqc instead of using the d-axis current command value Idc.

In the first process, as long as the d-axis voltage command value Vdc is derived by using the d-axis current command value Idc, the q-axis current command value Iqc may not be used to derive the d-axis voltage command value Vdc. For example, the q-axis F/F value Vffq derived by the q-axis side non-interference F/F unit 57 may not be used to derive the d-axis voltage command value Vdc.

In the first process, as long as the q-axis voltage command value Vqc is derived by using the q-axis current command value Iqc, the d-axis current command value Idc may not be used to derive the q-axis voltage command value Vqc. For example, the d-axis F/F value Vffd derived by the d-axis side non-interference F/F unit 41 may not be used to derive the q-axis voltage command value Vqc.

The voltage command values Vqc and Vdc may be derived with the q-axis as the first axis and the d-axis as the second axis, and the inverter 16 may be operated on the basis of the voltage command values Vqc and Vdc to drive the motor 100.

The motor control device 10 may have any one of the following configurations (a) to (c).

(a) The motor control device 10 includes one or more processors that execute various processes in accordance with a computer program. The processor includes a CPU and a memory such as an RAM and an ROM. The memory stores a program code or a command configured to cause the CPU to execute the processes. The memory, that is, a computer readable medium, includes any available medium that can be accessed by a general-purpose or dedicated computer.

(b) The motor control device 10 includes one or more dedicated hardware circuits that execute various processes. Examples of the dedicated hardware circuits include an integrated circuit for specific use, that is, an application specific integrated circuit (ASIC) or a field programmable gate array (FPGA).

(c) The motor control device 10 includes a processor that executes a part of various processes in accordance with a computer program, and a dedicated hardware circuit that executes the remaining processes in the various processes.

Next, technical ideas that can be understood from the above embodiment and the modifications will be described.

(i) A motor control device is configured to derive a first voltage command value serving as a command value of a voltage of a component in a first axis and a second voltage command value serving as a command value of a voltage of a component in a second axis orthogonal to the first axis in a vector control rotation coordinate, and drive a motor serving as a synchronous motor on the basis of the first voltage command value and the second voltage command value, and the motor control device includes:

a current command value deriving unit configured to derive, as a first current command value, a current of the component in the first axis corresponding to a torque command value serving as a command value of a torque of the motor, and derive, as a second current command value, a current of the component in the second axis corresponding to the torque command value; and a voltage command value deriving unit configured to derive the first voltage command value on the basis of a high-frequency fluctuation component of the current of the component in the first axis and the second current command value, and derive the second voltage command value on the basis of a limit voltage of the motor control device and the first voltage command value.

In a case in which the motor is driven by the field-weakening control, when the rotation speed of the motor increases, the current of the component in the second axis may resonate with respect to the second current command value. In this case, the high-frequency vibration component due to the resonance is superimposed on the current of the component in the second axis derived for each predetermined control cycle. Therefore, there is a room for improvement in controllability when the motor is driven by the field-weakening control.

According to the above configuration, when the motor is driven by the field-weakening control, the first voltage command value is derived by using the high-frequency fluctuation component of the current of the component in the first axis. The high-frequency fluctuation component of the current of the component in the first axis is a high-frequency vibration component superimposed on the first current command value. Therefore, by driving the motor on the basis of the first voltage command value derived in this way, the resonance of the current of the component in the second axis with respect to the second current command value can be cancelled. This is because the high-frequency vibration component of the current of the component in the second axis is cancelled by the high-frequency vibration of the current of the component in the first axis. As a result, the controllability when the motor is driven by the field-weakening control can be improved.

The invention claimed is:

1. A motor control device configured to derive a first voltage command value serving as a command value of a voltage of a component in a first axis and a second voltage command value serving as a command value of a voltage of a component in a second axis orthogonal to the first axis in a vector control rotation coordinate, and drive a motor serving as a synchronous motor on the basis of the first voltage command value and the second voltage command value, the motor control device comprising:
a current command value deriving unit configured to derive, as a first current command value, a current of the component in the first axis corresponding to a torque command value serving as a command value of a torque of the motor, and derive, as a second current command value, a current of the component in the second axis corresponding to the torque command value on the basis of a torque current map indicating a relationship between the torque of the motor and the current of the component in the first axis and the current of the component in the second axis; and
a voltage command value deriving unit configured to perform a first process of deriving the first voltage command value on the basis of the first current command value and deriving the second voltage command value on the basis of the second current command value, and a second process of deriving the first voltage command value on the basis of the second current command value and deriving the second voltage command value on the basis of a limit voltage of the motor control device and the first voltage command value, wherein
the voltage command value deriving unit switches a process of deriving the voltage command value from the second process to the first process when it is determined that the voltage command value satisfying the torque command value is derivable by the first process in a case in which the motor is driven on the basis of the voltage command value derived by the second process.

2. The motor control device according to claim 1, wherein in the second process, the voltage command value deriving unit derives the first voltage command value on the basis of a high-frequency fluctuation component of the current of the component in the first axis and the second current command value.

3. The motor control device according to claim 2, wherein when the process of deriving the voltage command value is switched from the second process to the first process, the voltage command value deriving unit derives the voltage command value according to a previous value of the first current command value during initial derivation of the voltage command value in the first process.

4. The motor control device according to claim 3, wherein when a current flowing from a motor power supply to the motor control device is a power supply current and an upper limit value of the power supply current is a power supply current upper limit value,
the torque current map indicates a relationship between the torque of the motor and the current of the component in the first axis and the current of the component in the second axis when a current larger than the power supply current upper limit value is allowed to flow from the motor power supply to the motor control device, and
the voltage command value deriving unit derives, in the second process, the first voltage command value on the basis of a calculated value derived by feedback control using a deviation between the power supply current upper limit value and the power supply current as an input.

5. The motor control device according to claim 2, wherein when a current flowing from a motor power supply to the motor control device is a power supply current and an upper limit value of the power supply current is a power supply current upper limit value,
the torque current map indicates a relationship between the torque of the motor and the current of the component in the first axis and the current of the component in the second axis when a current larger than the power supply current upper limit value is allowed to flow from the motor power supply to the motor control device, and
the voltage command value deriving unit derives, in the second process, the first voltage command value on the basis of a calculated value derived by feedback control using a deviation between the power supply current upper limit value and the power supply current as an input.

6. The motor control device according to claim 1, wherein when the process of deriving the voltage command value is switched from the second process to the first process,
the voltage command value deriving unit derives the voltage command value according to a previous value of the first current command value during initial derivation of the voltage command value in the first process.

7. The motor control device according to claim 6, wherein when a current flowing from a motor power supply to the motor control device is a power supply current and an upper limit value of the power supply current is a power supply current upper limit value,
the torque current map indicates a relationship between the torque of the motor and the current of the component in the first axis and the current of the component in the second axis when a current larger than the power supply current upper limit value is allowed to flow from the motor power supply to the motor control device, and
the voltage command value deriving unit derives, in the second process, the first voltage command value on the basis of a calculated value derived by feedback control using a deviation between the power supply current upper limit value and the power supply current as an input.

8. The motor control device according to claim 1, wherein when a current flowing from a motor power supply to the motor control device is a power supply current and an upper limit value of the power supply current is a power supply current upper limit value,
the torque current map indicates a relationship between the torque of the motor and the current of the component in the first axis and the current of the component in the second axis when a current larger than the power supply current upper limit value is allowed to flow from the motor power supply to the motor control device, and
the voltage command value deriving unit derives, in the second process, the first voltage command value on the basis of a calculated value derived by feedback control using a deviation between the power supply current upper limit value and the power supply current as an input.

* * * * *